United States Patent
Gray et al.

(10) Patent No.: US 12,114,401 B2
(45) Date of Patent: * Oct. 8, 2024

(54) ELECTRICALLY HEATED JACKET

(71) Applicant: MILWAUKEE ELECTRIC TOOL CORPORATION, Brookfield, WI (US)

(72) Inventors: Rick Gray, Delafield, WI (US); Jonathan A. Zick, Waukesha, WI (US); Paul Fry, Pewaukee, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 123 days.

This patent is subject to a terminal disclaimer.

(21) Appl. No.: 17/966,445

(22) Filed: Oct. 14, 2022

(65) Prior Publication Data

US 2023/0037725 A1 Feb. 9, 2023

Related U.S. Application Data

(63) Continuation of application No. 15/958,102, filed on Apr. 20, 2018, now Pat. No. 11,477,853, which is a
(Continued)

(51) Int. Cl.
*H05B 1/02* (2006.01)
*A41D 13/005* (2006.01)

(52) U.S. Cl.
CPC ....... *H05B 1/0272* (2013.01); *A41D 13/0051* (2013.01)

(58) Field of Classification Search
CPC ............................ H05B 1/0272; A41D 13/0051
(Continued)

(56) References Cited

U.S. PATENT DOCUMENTS 1,691,472 A 11/1928 Graham et al.
1,702,583 A 2/1929 Williams
(Continued)

FOREIGN PATENT DOCUMENTS

CN 1258201 A 6/2000
DE 20012075 U1 11/2000
(Continued)

OTHER PUBLICATIONS

DEWBU, "DEWBU Heated Jacket for Women with 12V Battery Pack Winter Outdoor Soft Shell Electric Hearing Coat," <https://www.amazon.com/dp/B07HR9XHPF/ref=sspa_dk_detail_0?ie=UTF8&psc=1&pd_rd_i=B07HR9XHPFp13NParams&s=apparel&sp_%E2%80%A6> web page visited Jun. 6, 2023 (11 pages).
(Continued)

*Primary Examiner* — John J Norton
(74) *Attorney, Agent, or Firm* — Michael Best & Friedrich LLP

(57) ABSTRACT

An article of clothing includes a garment body, a heater coupled to the garment body, a battery holder separate from the garment body and including a power terminal, and a rechargeable battery pack including a housing and a plurality of battery cells received in the housing and configured to provide power to the heater. The battery holder is detachably couplable to the garment body. The rechargeable battery pack is electrically connectable to the power terminal. The housing is detachably couplable to the battery holder. At least a portion of the housing is external to the battery holder when the rechargeable battery pack is coupled to the battery holder.

20 Claims, 9 Drawing Sheets

Related U.S. Application Data continuation of application No. 12/940,429, filed on Nov. 5, 2010, now abandoned.

(60) Provisional application No. 61/258,714, filed on Nov. 6, 2009.

(58) Field of Classification Search
USPC .......................................... 219/211, 212, 217
See application file for complete search history.

(56) References Cited

U.S. PATENT DOCUMENTS

| | | |
|---|---|---|
| 2,150,251 A | 3/1939 | Shanhouse |
| 2,156,504 A | 5/1939 | Liss |
| 2,685,021 A | 7/1954 | Duncan |
| 2,727,241 A | 12/1955 | Smith |
| 3,084,241 A | 4/1963 | Carrona |
| 3,293,405 A | 12/1966 | Costanzo |
| 3,392,264 A | 7/1968 | Arron |
| 3,501,616 A | 3/1970 | Arron |
| 3,663,796 A | 5/1972 | Hines et al. |
| 3,748,436 A | 7/1973 | Cossaboom |
| 3,953,935 A | 5/1976 | Reiner et al. |
| 3,989,924 A | 11/1976 | Kurtzer |
| 3,999,037 A | 12/1976 | Metcalf, Sr. |
| 4,273,989 A | 6/1981 | Hinton et al. |
| 4,279,255 A | 7/1981 | Hoffman |
| 4,404,460 A | 9/1983 | Kerr |
| 4,507,877 A | 4/1985 | Vaccari et al. |
| 4,539,700 A | 9/1985 | Sato |
| 4,589,134 A | 5/1986 | Waldron |
| 4,645,325 A | 2/1987 | Inoue et al. |
| 4,777,344 A | 10/1988 | Nash et al. |
| 4,827,534 A | 5/1989 | Haugen |
| 4,876,724 A | 10/1989 | Suzuki |
| 4,985,934 A | 1/1991 | Perry |
| 5,008,517 A | 4/1991 | Brekkstran et al. |
| 5,032,705 A | 7/1991 | Batchellar et al. |
| 5,101,515 A | 4/1992 | Holt et al. |
| 5,105,067 A | 4/1992 | Brekkstran et al. |
| 5,148,002 A | 9/1992 | Kuo et al. |
| 5,158,039 A | 10/1992 | Clark |
| 5,169,225 A | 12/1992 | Palm |
| 5,230,333 A | 7/1993 | Yates et al. |
| 5,302,806 A | 4/1994 | Simmons et al. |
| 5,302,807 A | 4/1994 | Zhao |
| 5,416,310 A | 5/1995 | Little |
| 5,451,747 A | 9/1995 | Sullivan et al. |
| 5,471,767 A | 12/1995 | Walker |
| 5,499,401 A | 3/1996 | Heinmiller |
| 5,603,646 A | 2/1997 | Tobias |
| 5,605,144 A | 2/1997 | Simmons et al. |
| 5,606,346 A | 2/1997 | Tobias |
| 5,611,085 A | 3/1997 | Rasmussen |
| 5,617,583 A | 4/1997 | Yates et al. |
| 5,741,305 A | 4/1998 | Vincent et al. |
| 5,777,296 A | 7/1998 | Bell |
| 5,784,626 A | 7/1998 | Odaohara |
| 5,826,273 A | 10/1998 | Eckes |
| 5,866,881 A | 2/1999 | Jones, III |
| 5,893,991 A | 4/1999 | Newell |
| 5,953,758 A | 9/1999 | Foster |
| 5,977,517 A | 11/1999 | Grosjean |
| 6,049,062 A | 4/2000 | Jones |
| 6,060,693 A | 5/2000 | Brown |
| 6,078,025 A | 6/2000 | Yeung |
| D429,058 S | 8/2000 | Derosier |
| 6,098,612 A | 8/2000 | Nakamoto et al. |
| 6,155,841 A | 12/2000 | Spanyar |
| 6,168,881 B1 | 1/2001 | Fischer et al. |
| 6,199,210 B1 | 3/2001 | Feldman |
| 6,232,674 B1 | 5/2001 | Frey et al. |
| 6,239,410 B1 | 5/2001 | Tackore |
| 6,319,015 B1 | 11/2001 | Faunce |
| 6,320,161 B1 | 11/2001 | Hansen, Jr. |
| 6,329,638 B1 | 12/2001 | Bloodworth |
| 6,333,570 B1 | 12/2001 | Ilg |
| 6,342,692 B1 | 1/2002 | Hart et al. |
| 6,350,129 B1 | 2/2002 | Gorlick |
| 6,439,942 B1 | 8/2002 | Pillai et al. |
| 6,450,168 B1 | 9/2002 | Nguyen |
| 6,519,779 B1 | 2/2003 | Taguchi |
| 6,550,471 B2 | 4/2003 | Szymocha et al. |
| 6,558,016 B1 | 5/2003 | Restauro |
| 6,561,814 B2 | 5/2003 | Tilbury et al. |
| 6,563,424 B1 | 5/2003 | Kaario |
| 6,598,235 B2 | 7/2003 | Bulla |
| 6,649,873 B1 | 11/2003 | Cintron, Jr. et al. |
| D487,426 S | 3/2004 | Johnson |
| 6,792,124 B2 | 9/2004 | Tilbury et al. |
| D498,037 S | 11/2004 | Bay |
| 6,826,782 B2 | 12/2004 | Jordan |
| 6,854,988 B2 | 2/2005 | Marmaropoulos et al. |
| 6,888,111 B1 | 5/2005 | Tobin |
| 6,963,055 B2 | 11/2005 | Rock et al. |
| 7,210,939 B2 | 5/2007 | Marmaropou et al. |
| 7,230,206 B1 | 6/2007 | Randall |
| 7,375,308 B2 | 5/2008 | Ferguson |
| 7,448,874 B2 | 11/2008 | Willis |
| 7,462,035 B2 | 12/2008 | Lee et al. |
| RE40,613 E | 1/2009 | Jordan |
| 7,476,104 B2 | 1/2009 | Marmaropoulos et al. |
| 7,496,969 B2 | 3/2009 | Pieczynski |
| 7,559,768 B2 | 7/2009 | Marmaropoulos et al. |
| 7,560,664 B2 | 7/2009 | Ford et al. |
| 7,618,260 B2 | 11/2009 | Daniel et al. |
| 7,624,453 B2 | 12/2009 | Rene et al. |
| 7,651,016 B2 | 1/2010 | Stewart |
| 7,731,517 B2 | 6/2010 | Lee et al. |
| 7,739,748 B2 | 6/2010 | Nilforushan et al. |
| 7,753,685 B2 | 7/2010 | Lee et al. |
| 7,816,628 B2 | 10/2010 | Fernandez et al. |
| 7,816,632 B2 | 10/2010 | Bourke, III et al. |
| D631,393 S | 2/2011 | Shani et al. |
| 7,886,368 B2 | 2/2011 | Hood |
| 7,959,351 B1 | 6/2011 | Thorpe |
| 7,966,667 B2 | 6/2011 | Tomlinson et al. |
| 7,994,752 B2 | 8/2011 | Soar |
| 8,062,797 B2 | 11/2011 | Fisher et al. |
| 8,105,371 B1 | 1/2012 | Giocondo, Jr. |
| 8,107,653 B2 | 1/2012 | Wolfe |
| 8,144,911 B2 | 3/2012 | Chiang et al. |
| 8,157,570 B2 | 4/2012 | Chen |
| 8,251,157 B2 | 8/2012 | Gray et al. |
| D669,500 S | 10/2012 | Dangerfield |
| 8,564,249 B2 | 10/2013 | Lundqvist et al. |
| D729,690 S | 5/2015 | Riviere |
| D766,844 S | 9/2016 | Turksu et al. |
| D808,616 S | 1/2018 | Dorman |
| D842,819 S | 3/2019 | Maetani et al. |
| D866,487 S | 11/2019 | Dorman |
| 11,033,059 B2 | 6/2021 | Janda et al. |
| D962,876 S | 9/2022 | Altonen et al. |
| D986,187 S | 5/2023 | Altonen et al. |
| D988,291 S | 6/2023 | Ebersole |
| 2001/0047992 A1 | 12/2001 | Deangelis et al. |
| 2002/0076949 A1 | 6/2002 | Tilbury et al. |
| 2003/0074712 A1 | 4/2003 | Liao |
| 2004/0069761 A1 | 4/2004 | Carr et al. |
| 2004/0070996 A1 | 4/2004 | Carr |
| 2004/0237169 A1 | 12/2004 | Wood et al. |
| 2004/0256381 A1 | 12/2004 | Haas et al. |
| 2004/0257038 A1 | 12/2004 | Johnson et al. |
| 2005/0007406 A1 | 1/2005 | Haas et al. |
| 2005/0246826 A1 | 11/2005 | McCarter et al. |
| 2006/0001727 A1 | 1/2006 | Haas et al. |
| 2006/0060576 A1 | 3/2006 | Haas et al. |
| 2006/0128169 A1 | 6/2006 | Marmaropoulos et al. |
| 2006/0166520 A1 | 7/2006 | Marmaropoulos et al. |
| 2006/0213895 A1 | 9/2006 | Dennis |
| 2006/0227675 A1 | 10/2006 | Fried |
| 2007/0045269 A1 | 3/2007 | Vassallo |
| 2007/0118960 A1 | 5/2007 | Goodwin |
| 2007/0151593 A1 | 7/2007 | Jaynes |

(56) References Cited

U.S. PATENT DOCUMENTS

| | | |
|---|---|---|
| 2007/0287035 A1 | 12/2007 | Marmaropoulos et al. |
| 2008/0005825 A1 | 1/2008 | Tronvold |
| 2008/0023460 A1 | 1/2008 | Huang |
| 2008/0024438 A1 | 1/2008 | Collins et al. |
| 2008/0067163 A1 | 3/2008 | Axinte et al. |
| 2008/0083740 A1 | 4/2008 | Kaiserman et al. |
| 2008/0184459 A1 | 8/2008 | Barnes |
| 2008/0223844 A1 | 9/2008 | Cronn |
| 2009/0014436 A1 | 1/2009 | Toya et al. |
| 2009/0032520 A1 | 2/2009 | Cronn |
| 2009/0094725 A1 | 4/2009 | Smith et al. |
| 2009/0158493 A1 | 6/2009 | Kim |
| 2009/0178173 A1 | 7/2009 | Schultz |
| 2009/0217440 A1 | 9/2009 | Sutker |
| 2009/0230112 A1 | 9/2009 | Ducharme et al. |
| 2009/0289046 A1 | 11/2009 | Richmond |
| 2009/0310290 A1 | 12/2009 | Tennent |
| 2010/0031424 A1 | 2/2010 | Sharpe et al. |
| 2010/0100997 A1 | 4/2010 | Lee et al. |
| 2010/0115684 A1 | 5/2010 | Freedman et al. |
| 2010/0198043 A1 | 8/2010 | Holzer et al. |
| 2010/0263603 A1 | 10/2010 | Baron |
| 2010/0283295 A1 | 11/2010 | Smith et al. |
| 2010/0299800 A1 | 12/2010 | Jackson |
| 2011/0012552 A1 | 1/2011 | Margalit |
| 2011/0108538 A1 | 5/2011 | Gray et al. |
| 2011/0173731 A1 | 7/2011 | McElroy et al. |
| 2011/0185469 A1 | 8/2011 | Santuccio et al. |
| 2011/0260556 A1 | 10/2011 | Partridge et al. |
| 2011/0306218 A1 | 12/2011 | Chen |
| 2012/0060260 A1 | 3/2012 | Kochling |
| 2012/0062571 A1 | 3/2012 | Malek |
| 2012/0074128 A1 | 3/2012 | Blackford et al. |
| 2012/0091115 A1 | 4/2012 | Mironichev et al. |
| 2012/0298493 A1 | 11/2012 | Hogan et al. |
| 2013/0037531 A1 | 2/2013 | Gray et al. |
| 2013/0227757 A1 | 9/2013 | Chen |
| 2013/0334194 A1 | 12/2013 | Chen |
| 2014/0246416 A1 | 9/2014 | White |
| 2015/0060430 A1 | 3/2015 | Tsuge et al. |
| 2015/0271873 A1 | 9/2015 | Gray et al. |
| 2017/0013889 A1 | 1/2017 | Chen |

FOREIGN PATENT DOCUMENTS

| | | |
|---|---|---|
| DE | 20012530 U1 | 11/2000 |
| FR | 2793116 A1 | 11/2000 |
| GB | 2158693 A | 11/1985 |
| JP | 6251757 A | 9/1994 |
| JP | 2000064112 A | 2/2000 |
| WO | 2012034416 A1 | 3/2012 |

OTHER PUBLICATIONS

Milwaukee Electric Tool, "M12™ Heated Jacket (Jacket Only)," <https://www.milwaukeetool.com/Products/Work-Gear/Heated-Gear/Heated-Jackets/2390> web page visited Jun. 6, 2023 (3 pages).

Milwaukee Electric Tool, "Women's Large M12 12-Volt Lithium-Ion Cordless AXIS Black Heated Quilted Jacket Kit with One 3.0 Ah Battery and Charger," <https://www.homedepot.com/p/Milwaukee-Women-s-Large-M12-12-Volt-Lithium-Ion-Cordless-AXIS-Black-Heated-Quilted-Jacket-Kit-with-One-3-0-Ah-Battery-and-Charger-234B-212X/321401962> web page visited Jun. 6, 2023 (6 pages).

PTAHDUS, "PTAHDUS Women's Heated Jacked with Battery Pack 7.4V, with Hand Warmer Pocket," <https://www.amazon.com/PTAHDUS-Womens-Battery-XX-Large-Amaranth/dp/B089QMK4NJ/ref=asc_df_B089QMK4NJ/?tag=hyprod-20&linkCode=%E2%80%A6> web page visited Jun. 6, 2023 (11 pages).

"Convertible Heated Soft-shell Jacket," http://www.plusheat.com/by-brand/convertible-heated-soft-shell-jacket.html, pp. 1-20, 2010.

Heated Electric Jacket Battery 12V Compatible, http://www.electricblanket.net/p-96-heated-electric-jacket-battery-12-volt-compatable.aspx, pp. 1-4, 1999.

Series and Parallel Battery Configurations and Information, <https://batteryuniversity.com/index.php/learn/article/serial_and_parallel_battery_configurations>, Jun. 18, 2019 (4 pages).

Schmidt et al., "Modeling the Impact of Manufacturing Uncertainties on Lithium-Ion Batteries," Journal of the Electrochemical Society, 2020, vol. 167, 15 pages.

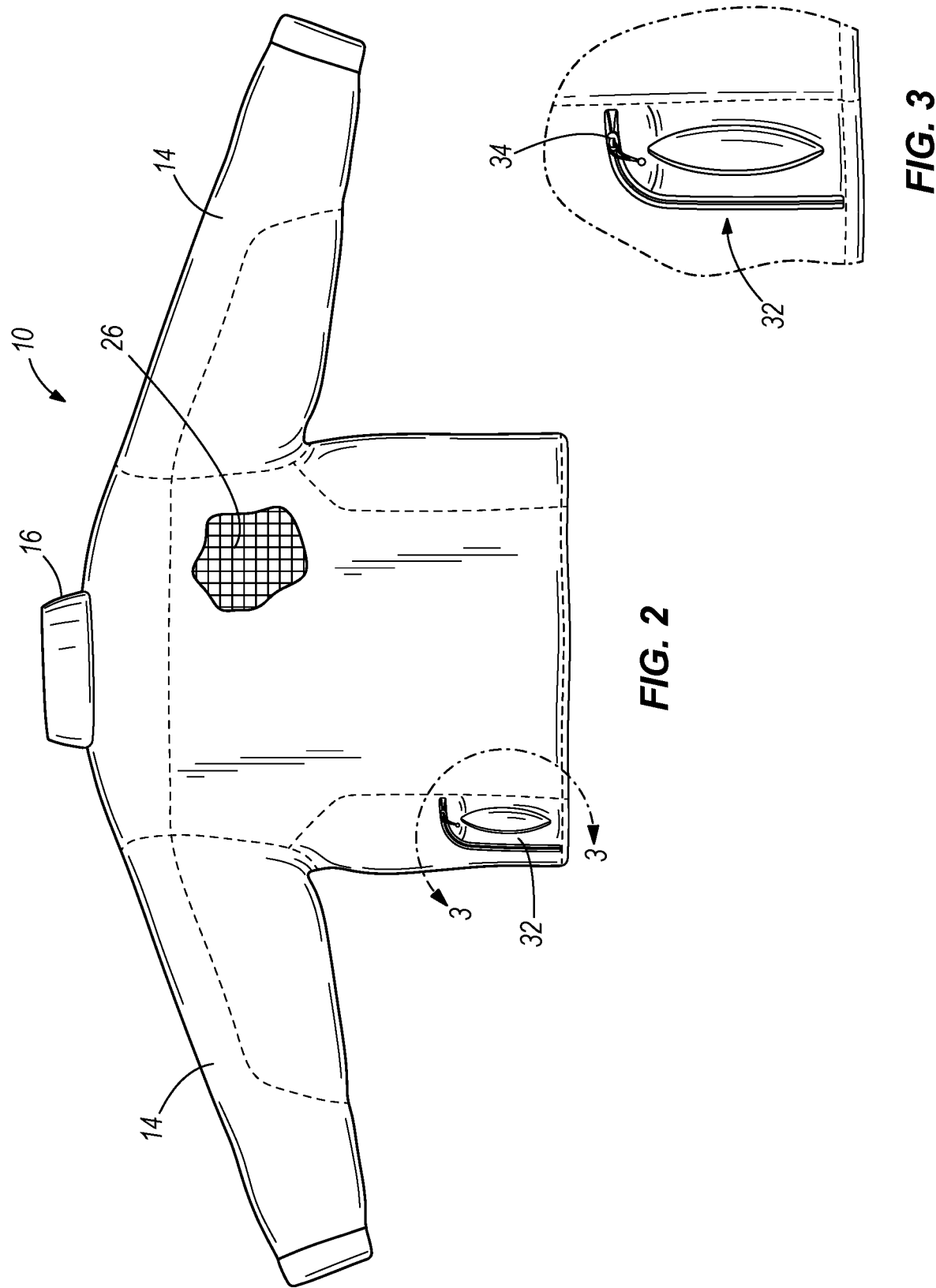

ELECTRICALLY HEATED JACKET

CROSS-REFERENCE TO RELATED APPLICATIONS

This application is a continuation of U.S. patent application Ser. No. 15/958,102 filed on Apr. 20, 2018, now U.S. Pat. No. 11,477,853, which is a continuation of U.S. patent application Ser. No. 12/940,429 filed on Nov. 5, 2010, now abandoned, which claims priority to U.S. Provisional Patent Application No. 61/258,714 filed on Nov. 6, 2009, the entire contents of all of which are incorporated herein by reference.

FIELD OF INVENTION

The present invention relates to garments, and in particular, to an electrically heated jacket for providing heat to a user wearing the jacket.

BACKGROUND

Garments, especially outwear such as jackets and parkas, may be insulated to protect a user from the cold. Insulated jackets rely on the user's own body heat to keep the user warm. If the insulation is too thin, the user may be cold. If the insulation is too thick, the user may overheat.

SUMMARY OF THE INVENTION

In one aspect, the disclosure provides an article of clothing. The article of clothing includes a garment body, a heater coupled to the garment body, a battery holder separate from the garment body and including a power terminal, and a rechargeable battery pack including a housing and a plurality of battery cells received in the housing and configured to provide power to the heater. The battery holder is detachably couplable to the garment body. The rechargeable battery pack is electrically connectable to the power terminal. The housing is detachably couplable to the battery holder. At least a portion of the housing is external to the battery holder when the rechargeable battery pack is coupled to the battery holder.

In another aspect, the disclosure provides an electrical combination including a power tool, a rechargeable battery pack operable to power the power tool when connected to the power tool, an article of clothing including a garment body and a heater coupled to the garment body, and a battery holder separate from the garment body and including a power terminal, the battery holder being detachably couplable to the garment body. The rechargeable battery pack includes a housing and a plurality of battery cells received in the housing. The rechargeable battery pack is electrically connectable to the power terminal to power the heater. The housing is detachably couplable to the battery holder. At least a portion of the housing is external to the battery holder when the rechargeable battery pack is coupled to the battery holder.

In yet another aspect, the disclosure provides an article of clothing including a garment body, a heater coupled to the garment body, a rechargeable battery pack including a housing substantially enclosing a plurality of battery cells, and a battery holder. The battery holder includes a power terminal configured to provide power from the plurality of battery cells to the heater. The battery holder is detachably couplable to the garment body. The battery holder is detachably couplable to the housing. At least a portion of the housing is external to the battery holder when the rechargeable battery pack is electrically connected to the battery holder.

Other aspects of the invention will become apparent by consideration of the detailed description and accompanying drawings.

BRIEF DESCRIPTION OF THE DRAWINGS

FIG. 2 is a rear view of the jacket of FIG. 1.

FIG. 3 is a detailed view of a rear compartment of the jacket of FIG. 2, and taken along line 3-3 of FIG. 2.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
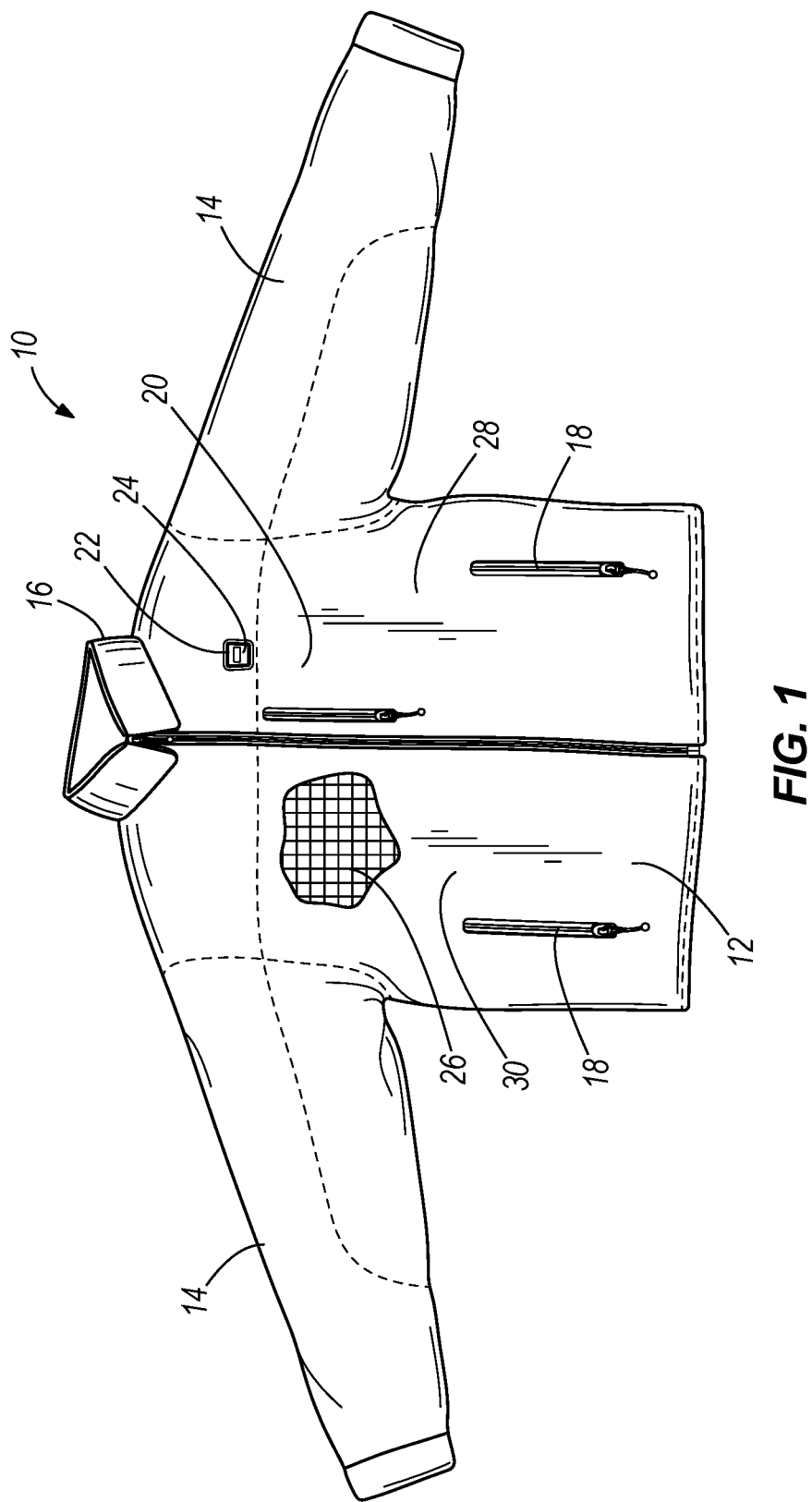
FIG. 1 is a front view of a jacket according to one embodiment of the invention.

FIG. 1 illustrates a heated jacket 10 according to one embodiment of the invention. The jacket 10 may be constructed in various sizes to fit a variety of users. The jacket 10 includes typical jacket features such as a torso body 12, arms 14, a collar 16, and front pockets 18. A front surface 20 of the jacket 10 includes a control input. In the illustrated embodiment, the control input is a button 22 that may be actuated by user. As explained in greater detail below, the button 22 includes a display portion 24 to indicate a status of the heated jacket 10.

As illustrated in cutaway portions of FIGS. 1 and 2, the jacket 10 includes a heater array 26. The heater array 26 is disposed in both a left portion 28 and a right portion 30 of the torso body 12. In some embodiments, the heater array 26 may extend into the arms 14 and/or collar 16. In other embodiments the jacket may include a first heater array and second heater array arranged as an upper module and a lower module, respectively. In the illustrated embodiment, the heater array 26 is controlled via the button 22 shown in FIG. 1. In other embodiments, multiple heater arrays may be controlled individually via a single control input or multiple control inputs. The heating array 26 may include resistive heating coils formed of carbon fibers, high density carbon fibers, or other heating devices. The heated jacket 10 is capable of maintaining a temperature of up to 110 degrees Fahrenheit, although in further embodiments lower or greater temperatures are possible depending upon the heat source.

Figure 4:
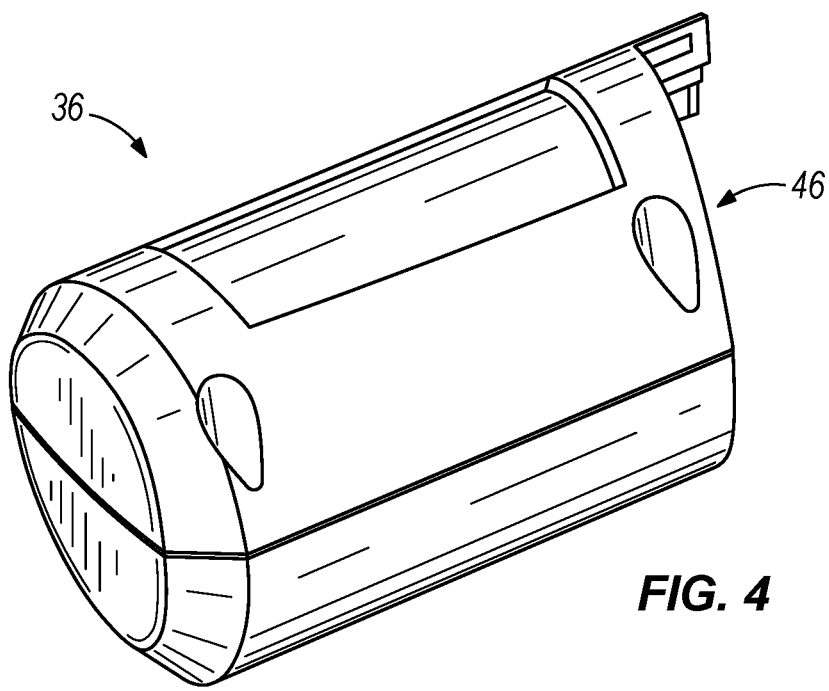
FIG. 4 is a perspective view of a battery holder according to one embodiment of the invention.

As illustrated in FIG. 2, the heated jacket 10 includes a compartment 32 located on a lower portion of the back torso body. The compartment 32 houses an electrical component, such as a battery pack and battery holder. As illustrated in FIG. 3, the compartment 32 includes a zipper 34, providing selective access by a user to the compartment 32 in order to access the battery pack and other electrical components. FIG. 4 illustrates one example of a battery holder 36. The battery holder 36 is configured to receive a battery pack 38, such as the battery pack illustrated in FIG. 5.

Figure 5:
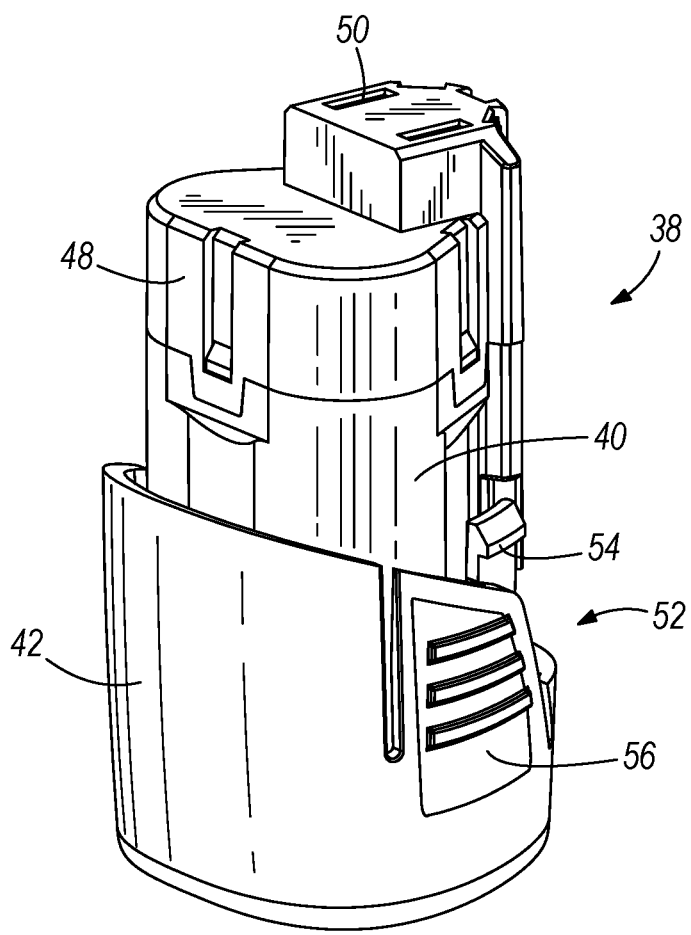
FIG. 5 is a perspective view of a battery pack for use with the battery holder of FIG. 4.
Figure 13:
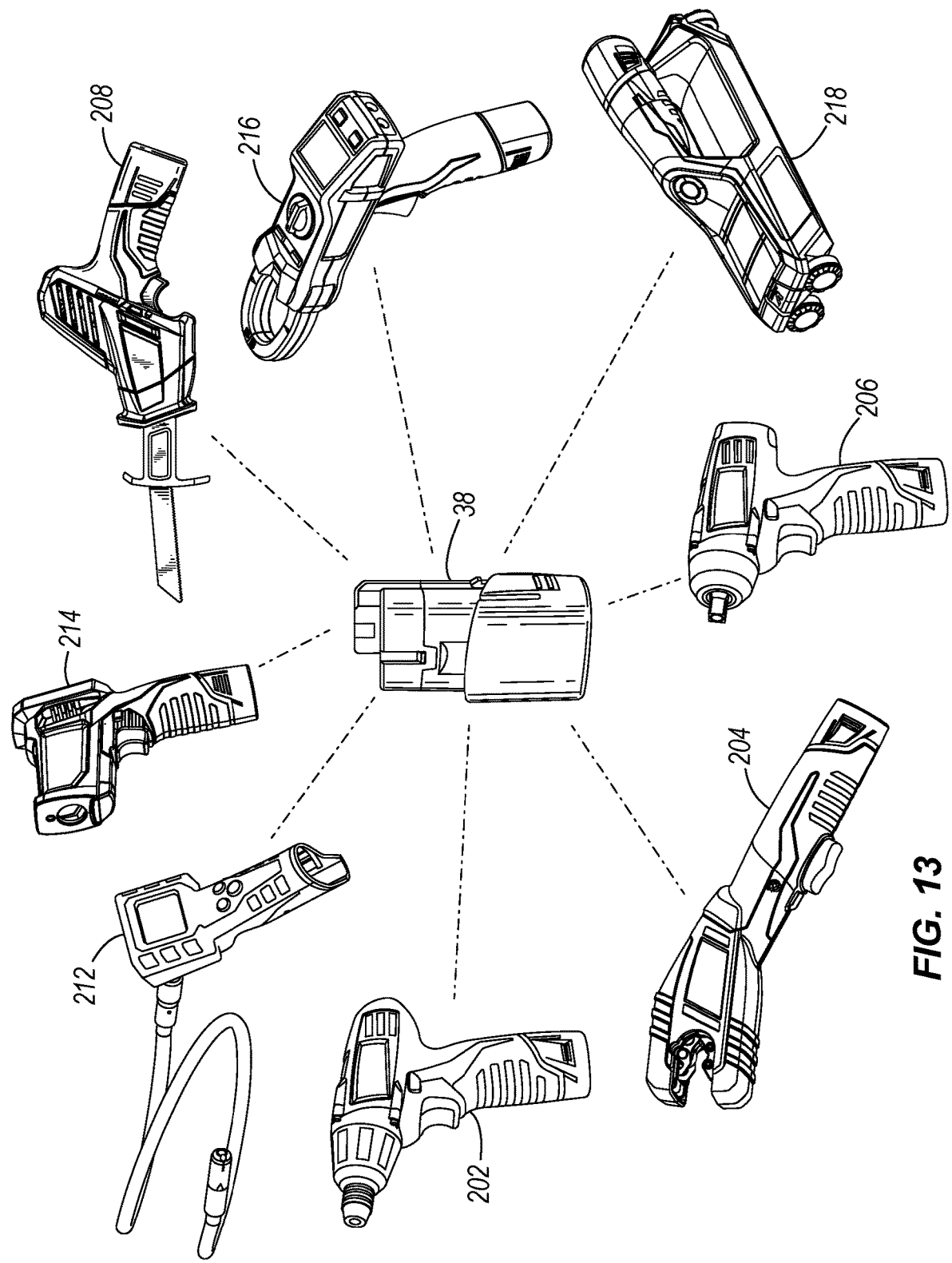
FIG. 13 is a perspective view of tools and devices usable with the battery pack of FIG. 5.

Referring to FIG. 5, the battery pack 38 is a lithium-based, rechargeable battery pack. The battery pack 38 is removably and interchangeably connected to the battery holder 36 to provide power to the jacket 10 during operation and to facilitate recharging of the battery pack 38 when not in use. In some embodiments, the battery pack 38 may be used with other types of cordless, battery-powered tools or devices. FIG. 13, discussed below, illustrates exemplary tools and devices with which the battery pack 38 may be used. The battery pack 38 also may be used with other power tools or sensing devices not specifically discussed herein.

Figure 6:
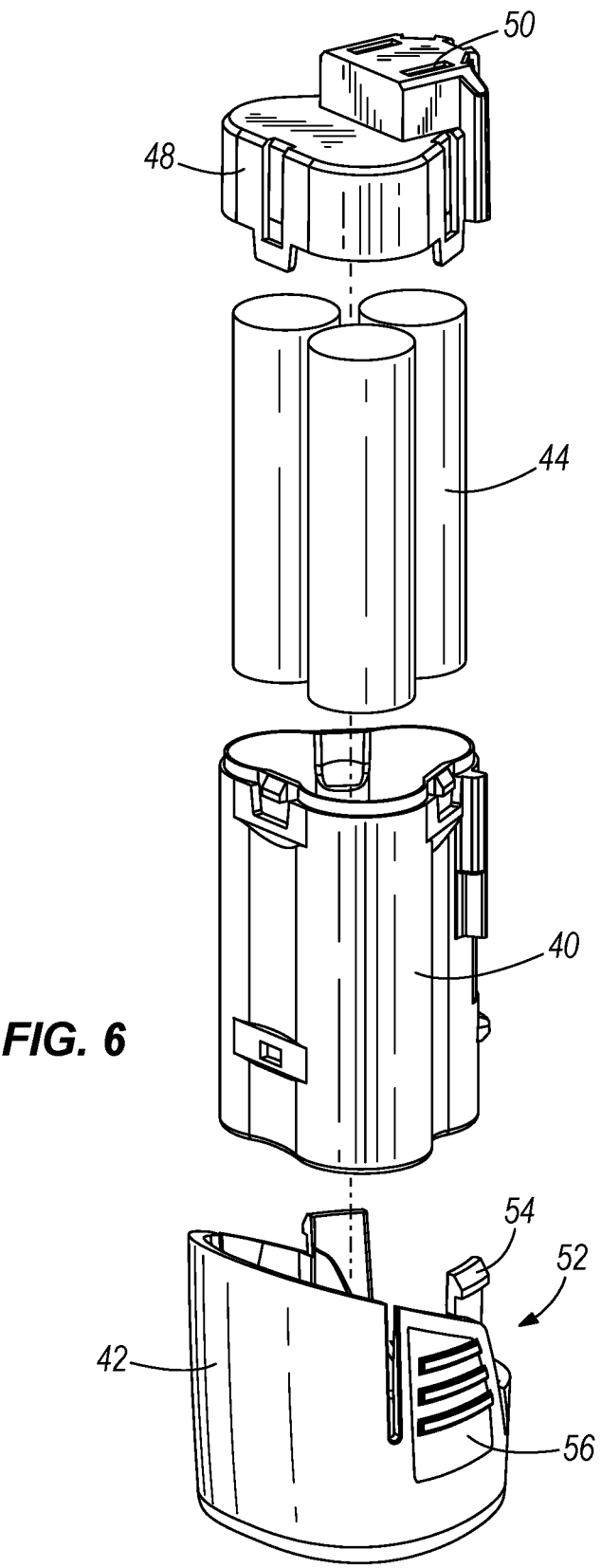
FIG. 6 is an exploded view of the battery pack of FIG. 5.

As illustrated in FIGS. 5 and 6, the battery pack 38 includes a casing 40, an outer housing 42 coupled to the casing 40, and a plurality of battery cells 44 positioned within the casing 40. The casing 40 is shaped and sized to fit within a cavity 46 of the battery holder 36 illustrated in FIG. 4, or alternatively, in a power tool or non-motorized sensing device to connect the battery pack 38 to the tool or device. The casing 40 includes an end cap 48 to substantially enclose the battery cells 44 within the casing 40. The illustrated end cap 48 includes two power terminals 50 configured to mate with corresponding power terminals 60 (FIG. 7) extending within the cavity 46 of the battery holder 36. In other embodiments, the end cap 48 may also include sense or communication terminals that are configured to mate with corresponding terminals within the battery holder or a tool. The outer housing 42 includes a latching arrangement 52 for positively engaging the battery pack 38 with the battery holder 36. The latching arrangement 52 includes latching tabs 54 and resilient actuating portions 56. The latching tabs 54 are configured to engage corresponding recesses within the cavity 46 of the battery holder 36. The resilient actuating portions 56 are coupled to the latching tabs 54 and are configured for a user to selectively disengage the latching tabs 54 from the battery holder 36.

As shown in FIG. 6, the battery pack 38 includes three battery cells 44 positioned within the casing 40 and electrically coupled to the terminals 50. The battery cells provide operational power (e.g., DC power) to the jacket 10 or other device. In the illustrated embodiment, the battery cells 44 are arranged in series, and each battery cell has a nominal voltage of approximately four-volts (4.0V), such that the battery pack 38 has a nominal voltage of approximately twelve-volts (12V). The cells 44 also have a capacity rating of approximately 1.4 Ah. In other embodiments, the battery pack 38 may include more or fewer battery cells 44, and the cells 44 can be arranged in series, parallel, or a serial and parallel combination. For example, the battery pack 38 can include a total of six battery cells in a parallel arrangement of two sets of three series-connected cells. The series-parallel combination of battery cells creates a battery pack having a nominal voltage of approximately 12V and a capacity rating of approximately 2.8 Ah. In other embodiments, the battery cells 44 may have different nominal voltages, such as, for example, 3.6V, 3.8V, 4.2V, etc., and/or may have different capacity ratings, such as, for example, 1.2 Ah, 1.3 Ah, 2.0 Ah, 2.4 Ah, 2.6 Ah, 3.0 Ah, etc. In other embodiments, the battery pack 38 can have a different nominal voltage, such as, for example, 10.8V, 14.4V, etc. In the illustrated embodiment, the battery cells 44 are lithium-ion battery cells having a chemistry of, for example, lithium-cobalt (Li—Co), lithium-manganese (Li—Mn), or Li—Mn spinel. In other embodiments, the battery cells 44 may have other suitable lithium or lithium-based chemistries.

Figure 7:
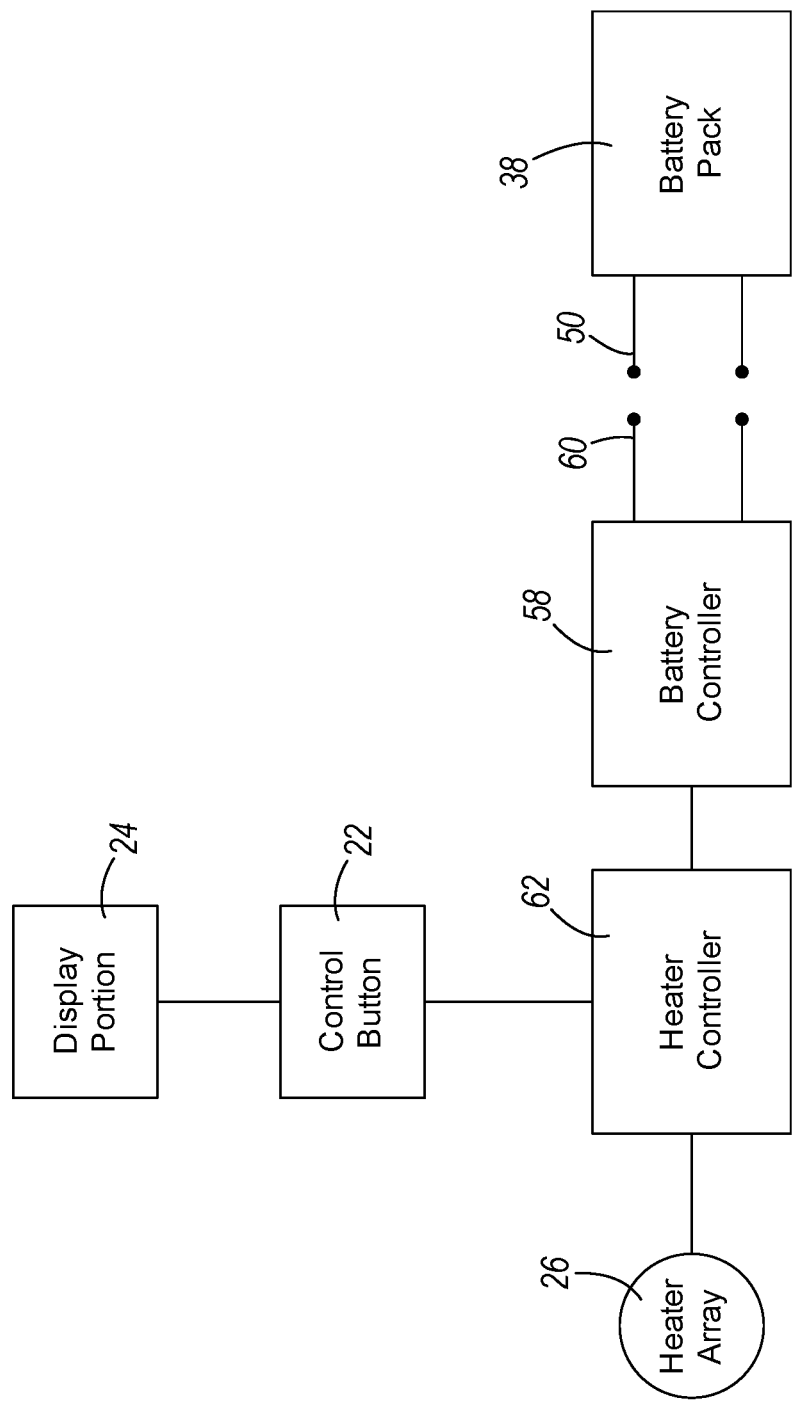
FIG. 7 is an electrical block diagram for the jacket of FIG. 1.

The heated jacket 10 includes control circuitry for the heater array 26 and battery pack 38. FIG. 7 is a block diagram of the heated jacket 10. A battery controller 58 receives electricity from the battery pack 38 via battery terminals 60 (disposed within the battery holder 36). The battery controller 58 may be configured to monitor a state of charge of the battery pack 38 and, if necessary, shutdown the heater array 26.

A heater controller 62 receives inputs from the control button 22 and selectively powers the heater array 26 depending upon the selected thermal output. The display portion 24 is selectively illuminated based upon the selected thermal output setting. The heater controller 62 may be configured to monitor a plurality of conditions of the jacket 10 including, but not limited to, an amount of current drawn by the heater array 26. The controllers 58, 62 are, for example, microprocessors, microcontrollers, or the like, and are configured to communicate with one another. In the illustrated embodiment, the battery controller 58 provides information to the heater controller 62 related to a battery pack temperature or voltage level. The heater controller 62 and the battery controller 58 also include low voltage monitors and state-of-charge monitors. The monitors are used to determine whether the battery pack 38 is experiencing a low voltage condition, which may prevent proper operation of the heater array 26, or if the battery pack 38 is in a state-of-charge that makes the battery pack 38 susceptible to being damaged. If such a low voltage condition or state-of-charge exists, the heater array 26 is shut down or the battery pack 38 is otherwise prevented from further discharging current to prevent the battery pack from becoming further depleted.

The heated jacket 10 illustrated in FIGS. 1 and 2 may be operated as follows. To turn on the heated jacket 10, a user presses and holds the control button 22 for a first period (e.g., three seconds). When first turned on, the heater controller 62 causes the heated jacket 10 to enter pre-heat mode. The heated jacket 10 remains in a pre-heat mode for a period (e.g., five minutes) and then the heater controller 62 switches the heater array 26 to a medium thermal output setting. The user may adjust the thermal output setting by actuating the control button 22. Each press of the control button 22 will cycle the heater controller 62 through one of a sequence of thermal output settings (e.g., low, medium, high). In order to turn off the heated jacket 10 (or de-energize the heater array 26), the user presses and holds the control button 22 for a third period (e.g., three seconds).

As mentioned previously, the control button 22 includes an illuminated display portion 24 to indicate a status of the heaters. The display portion may be, for example, one or more LEDs. In the pre-heat mode, the display portion 24 flashes red. At a low thermal output setting, the display portion 24 glows blue. At a medium thermal output setting, the display portion 24 glows white. At a high thermal output setting, the display portion glows red. Other embodiments may use various other colors or light patterns to indicate thermal output settings. Still other embodiments may indicate a state of charge of the battery pack 38.

Various modifications of the control method or sequence are possible. For example, in other embodiments, the user may select a desired temperature rather than a thermal output setting.

Figure 8:
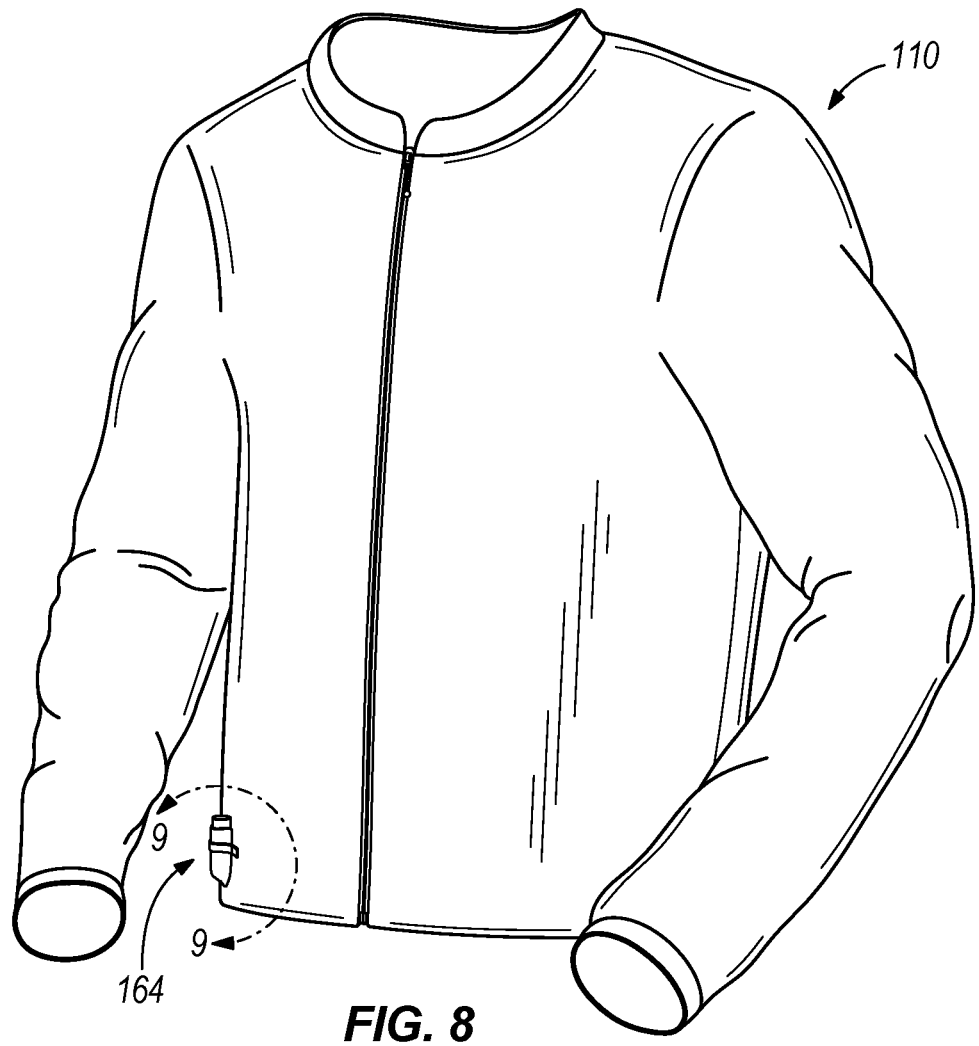
FIG. 8 is an image of a heated jacket including a heating module according to another embodiment of the invention.
Figure 9:
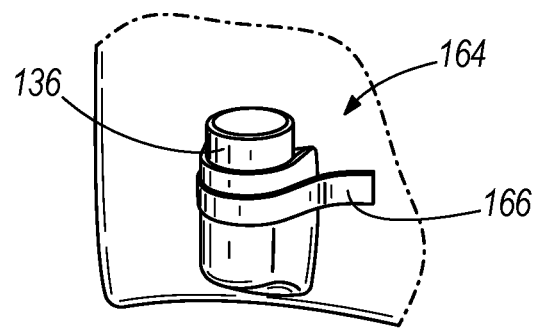
FIG. 9 is an enlarged view of the heated jacket including the heating module of FIG. 8.

FIG. 8 illustrates a heated jacket 110 according to another embodiment of the invention. The heated jacket 110 may be constructed in various sizes to fit a variety of users. FIG. 9 is an enlarged view of a heating module 164, which is coupled to an outside surface of the jacket 110 by way of a strap 166. Alternatively, the heating module 164 may be coupled to an inner surface of the jacket 110 or disposed inside of an inner pocket of the jacket 110.

The heating module 164 includes a battery pack holder 136 (FIGS. 10 and 11) and a battery pack 38 (FIG. 5). The heating module 164 is electrically coupled to one or more heating coils (not shown) positioned within the jacket 110 to heat the jacket and provide heat to a user wearing the jacket. In the illustrated embodiment, multiple heating coils are employed and positioned in various locations, or zones, within the jacket. For example, separate heating coils may be positioned in an upper torso area and a lower torso area, and may be separately controllable by the user. In further embodiments, a single heating coil may be used, or the heating coils may be positioned at other locations within the jacket, (e.g., the back, arms, etc.).

Figure 10:
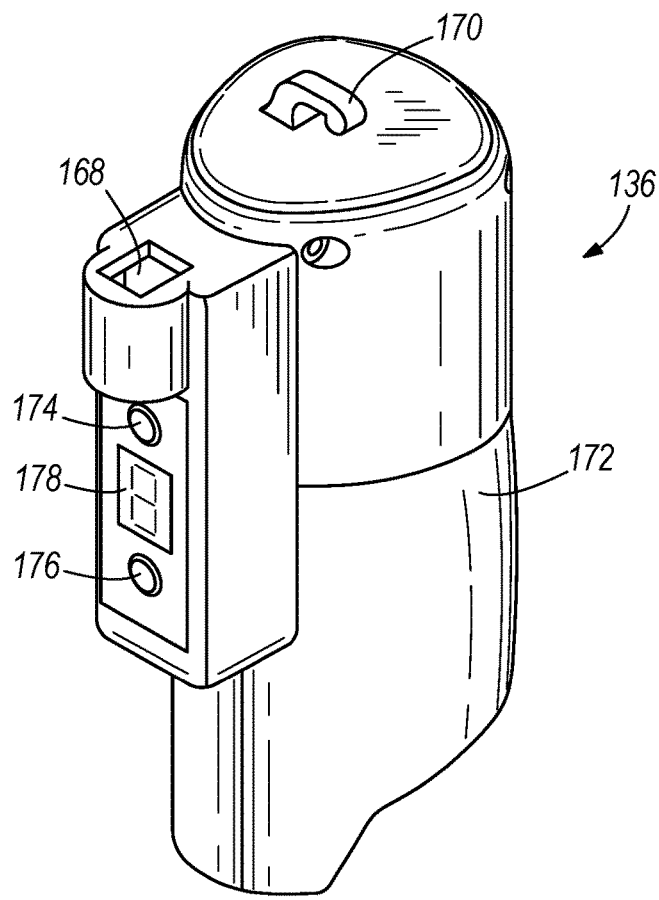
FIG. 10 is a top perspective view of a portion the heating module of FIG. 8.
Figure 11:
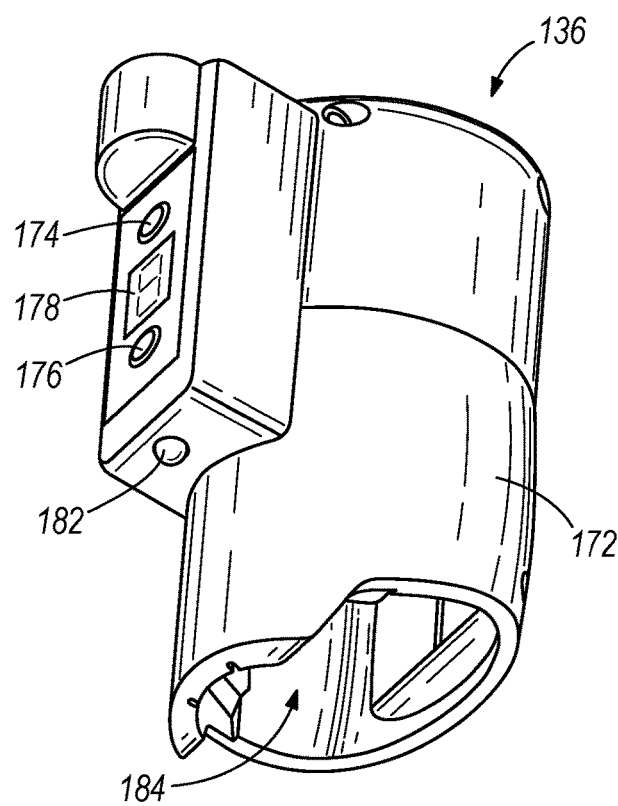
FIG. 11 is a bottom perspective view of the portion of the heating module of FIG. 10.
Figure 10A:
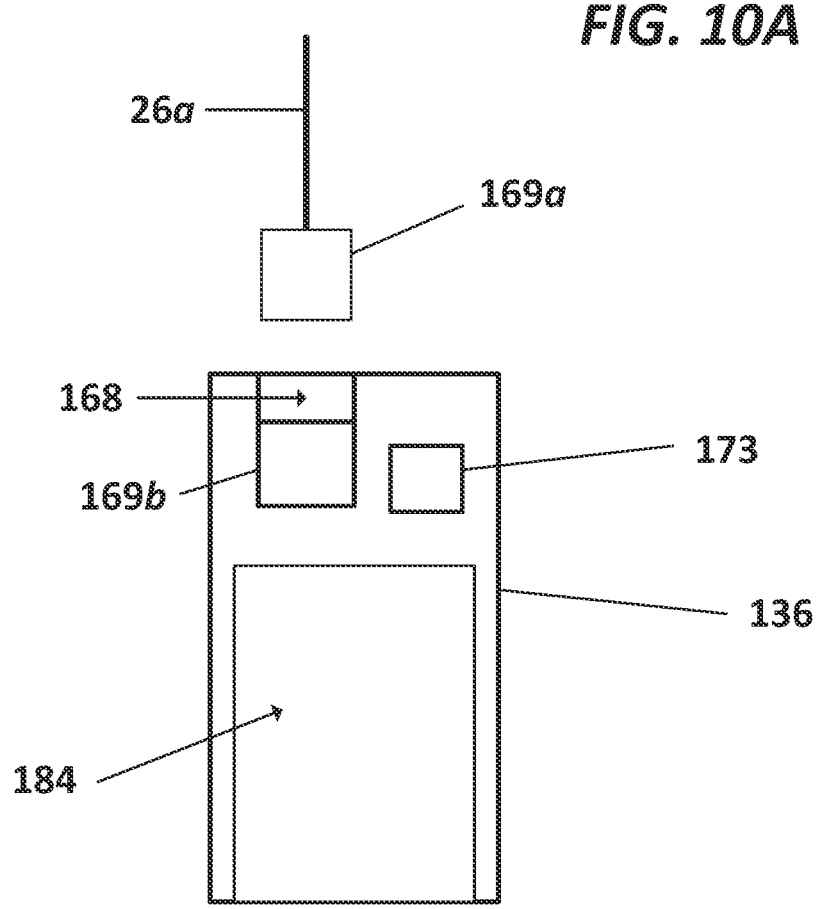
FIG. 10A is a schematic illustration of a portion of the heating module shown in FIG. 10.

FIGS. 10 and 11 illustrate the battery holder 136 of the heating module 164 in greater detail. With reference to FIG. 11, the battery holder 136 includes an aperture 168 for receiving an end of a cord 26a, the cord 26a being connected to the one or more heating coils and including a male connector terminal 169a. A female connector 169b is positioned within the battery holder 136 adjacent the aperture 168 to receive the male connector 169a and form an electrical connection between the heating coils and the battery pack 38. The battery holder 136 also includes a hook 170 for securing the cord disposed between the connector and the jacket 110.

Figure 12:
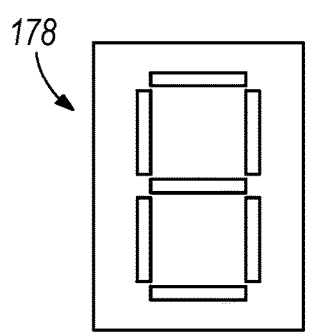
FIG. 12 is a front view of a display for positioning in an aperture of the heating module of FIG. 10.

With further reference to FIG. 10, the battery holder 136 includes a housing portion 172 for electrical components, including a circuit board 173. The housing portion 172 includes a first button 174, a second button 176 and a display 178. The first button 174 and the second button 176 are capable of communicating with the electrical components. In the illustrated embodiment, the first button 174 is pressed by a user to increase the temperature of the heating coils, and the second button 176 is pressed by a user for lowering the temperature of the heating coils. In the illustrated embodiment of FIG. 12, the display 178 is a seven segment display for representing a heating level indicative of the temperature of the heating coils.

With reference to FIG. 11, the battery holder 136 includes a power indicator 182, such as a light emitting diode (LED) that displays to the user when lit that the battery is connected, the heating coils are on, or the like. A portion of the battery holder 136 defines a battery cavity 184 for receiving the battery pack 38 (FIG. 5).

In other embodiments, the battery holder 136 includes an on/off switch (such as the control button 22 discussed above), a fuel gauge that displays the amount of battery power remaining, and a user interface including heat zone controls to individually control the heating coils if multiple heating coils are employed.

FIG. 13 illustrates exemplary power tools and sensing devices with which the battery pack 38 may be usable. The battery pack 38 may be usable with power tools such as a drill 202, a pipe cutter 204, an impact driver 206, and a reciprocating saw 208. The battery pack 38 may also be usable with non-motorized sensing devices such as a visual inspection camera 212, an infrared sensor 214 (such as a thermometer or thermal imaging camera), a clamp-type multimeter 216, and a wall scanner 218 (such as a "stud finder").

Although the invention has been described in detail with reference to certain preferred embodiments, variations and modifications exist within the scope and spirit of one or more independent aspects of the invention as described.

What is claimed is:

1. An article of clothing comprising:
a garment body;
a heater coupled to the garment body;
a battery holder separate from the garment body and including a power terminal, the battery holder being detachably couplable to the garment body; and
a rechargeable battery pack including a housing and a plurality of battery cells received in the housing and configured to provide power to the heater, the rechargeable battery pack being electrically connectable to the power terminal, the housing being detachably couplable to the battery holder, wherein at least a portion of the housing is external to the battery holder when the rechargeable battery pack is coupled to the battery holder.

2. The article of clothing of claim 1, wherein the housing substantially encloses the plurality of battery cells.

3. The article of clothing of claim 1, wherein the housing includes a casing receiving the plurality of battery cells and an outer housing including a latching arrangement, wherein the outer housing includes the at least a portion of the housing external to the battery holder.

4. The article of clothing of claim 1, wherein the battery holder includes a circuit board.

5. The article of clothing of claim 1, further comprising a latching arrangement having a user-operable release, the latching arrangement configured to detachably couple the battery pack to the battery holder.

6. The article of clothing of claim 1, wherein the housing of the battery pack is configured to be detachably couplable to a plurality of power tools interchangeably with the battery holder.

7. The article of clothing of claim 1, wherein the housing of the battery pack is configured to be detachably couplable to a plurality of non-motorized sensing devices interchangeably with the battery holder.

8. The article of clothing of claim 1, further comprising a user input member configured for selecting a thermal output setting of the heater.

9. The article of clothing of claim 8, wherein the user input member is coupled to an external surface of the garment.

10. The article of clothing of claim 1, wherein the garment body includes a pocket for receiving the battery holder and the rechargeable battery pack.

11. The article of clothing of claim 1, further comprising a cord extending from the heater, the cord including a male connector, wherein the battery holder includes a female connector configured to receive the male connector.

12. The article of clothing of claim 1, wherein a controller selectively provides power from the rechargeable battery pack to the heater in response to control signals from a user input member, the controller configured to cause the heater to enter a pre-heat mode in response to a first signal from the user input member, maintain the heater in the pre-heat mode for a first time period, automatically switch the heater to a first thermal setting at the end of the first time period, and selectively switch the heater to a second thermal setting in response to a second signal from the user input member.

13. The article of clothing of claim 1, wherein the battery holder is detachably coupleable to the garment body by being receivable in a compartment of the garment body.

14. The article of clothing of claim 1, wherein the battery holder is detachably coupleable to the garment body by way of a strap.

15. The article of clothing of claim 1, wherein the battery holder is configured to facilitate recharging of the rechargeable battery pack.

16. An electrical combination comprising:
   a power tool;
   a rechargeable battery pack operable to power the power tool when connected to the power tool, the rechargeable battery pack including a housing and a plurality of battery cells received in the housing;
   an article of clothing including
      a garment body; and
      a heater coupled to the garment body; and
   a battery holder separate from the garment body and including a power terminal, the battery holder being detachably coupleable to the garment body;
   wherein the rechargeable battery pack is electrically connectable to the power terminal to power the heater, the housing being detachably coupleable to the battery holder, wherein at least a portion of the housing is external to the battery holder when the rechargeable battery pack is coupled to the battery holder.

17. The electrical combination of claim 16, wherein the rechargeable battery pack has a nominal voltage of at least 10.8 volts, and wherein the plurality of battery cells includes at least three battery cells, each battery cell having a nominal voltage of at least 3.6 volts, a capacity of at least 1.2 Ah, and a lithium-based chemistry.

18. An article of clothing comprising:
   a garment body;
   a heater coupled to the garment body;
   a rechargeable battery pack including a housing substantially enclosing a plurality of battery cells; and
   a battery holder including a power terminal configured to provide power from the plurality of battery cells to the heater, the battery holder being detachably coupleable to the garment body, the battery holder being detachably coupleable to the housing, wherein at least a portion of the housing is external to the battery holder when the rechargeable battery pack is electrically connected to the battery holder.

19. The article of clothing of claim 18, wherein the housing includes a casing receiving the plurality of battery cells and an outer housing including the at least a portion of the housing external to the battery holder.

20. The article of clothing of claim 18, wherein the outer housing includes a latching arrangement configured for positively engaging the rechargeable battery pack with the battery holder, the latching arrangement including a user-actuatable surface configured for selectively disengaging the rechargeable battery pack from the battery holder.

* * * * *